United States Patent
Hekstra-Nowacka

(10) Patent No.: US 8,732,325 B2
(45) Date of Patent: May 20, 2014

(54) SYSTEM AND METHOD FOR TRANSMITTING DATA

(75) Inventor: Ewa Hekstra-Nowacka, Waalre (NL)

(73) Assignee: ST-Ericsson SA, Plan-les-Ouates (CH)

( * ) Notice: Subject to any disclaimer, the term of this patent is extended or adjusted under 35 U.S.C. 154(b) by 745 days.

(21) Appl. No.: 11/914,230

(22) PCT Filed: May 3, 2006

(86) PCT No.: PCT/IB2006/051394
§ 371 (c)(1),
(2), (4) Date: Dec. 12, 2007

(87) PCT Pub. No.: WO2006/120615
PCT Pub. Date: Nov. 16, 2006

(65) Prior Publication Data
US 2008/0209064 A1 Aug. 28, 2008

(30) Foreign Application Priority Data
May 10, 2005 (EP) .................... 05103855

(51) Int. Cl.
*G06F 15/16* (2006.01)
*G06F 15/173* (2006.01)
*H04B 7/212* (2006.01)

(52) U.S. Cl.
USPC ............... 709/231; 709/240; 370/321

(58) Field of Classification Search
USPC .................... 709/231, 240; 370/321
See application file for complete search history.

(56) References Cited

U.S. PATENT DOCUMENTS

| | | | |
|---|---|---|---|
| 6,374,112 B1* | 4/2002 | Widegren et al. | 455/452.2 |
| 2005/0203988 A1* | 9/2005 | Nollet et al. | 709/201 |
| 2005/0249114 A1* | 11/2005 | Mangin et al. | 370/229 |
| 2005/0281278 A1* | 12/2005 | Black et al. | 370/412 |
| 2007/0191054 A1* | 8/2007 | Das et al. | 455/525 |

FOREIGN PATENT DOCUMENTS

| | | | |
|---|---|---|---|
| EP | 0862313 A2 | | 9/1998 |
| JP | 10243327 A | | 9/1998 |
| JP | 2000299692 A | | 10/2000 |
| JP | 2003087185 A | | 3/2003 |
| WO | 0144955 A2 | | 6/2001 |

OTHER PUBLICATIONS

Dielissen, J; et al "Concepts and Implementation of the Philips Network-On-Chip" Internet Citation, Nov. 13, 2003. Downloaded From: http://homepages.inf.ed.ac.uk/kgoossen/2003-ipsoc.pdf.

Written Opinion of the International Searching Authority dated Jan. 31, 2007 in connection with International Patent Application No. PCT/IB2006/051394.

International Search Report dated Jan. 31, 2007 in connection with International Patent Application No. PCT/IB2006/051394.

* cited by examiner

*Primary Examiner* — Ranodhi Serrao
(74) *Attorney, Agent, or Firm* — Coats & Bennett, P.L.L.C.

(57) ABSTRACT

A device for transmitting data to a further device is arranged for transmitting a first class of data as a guaranteed stream of data-units, and for transmitting a second class of data-units on a best effort basis. The device starts the transmission of a burst of data-units which belong to the second class at a point in time where the remaining time interval until the start of the next burst of first-class data minus the required time for transmitting the burst of second-class of data is less than a predetermined time.

20 Claims, 8 Drawing Sheets

SYSTEM AND METHOD FOR TRANSMITTING DATA

TECHNICAL FIELD

The present invention relates to a device and a method for transmitting data.

BACKGROUND

There is a clear trend to compose systems, e.g. mobile phones, in a modular fashion wherein various modules are coupled together via a universal interface. The modules may exchange data with each other via a connection, such as a bus or a network. The available bandwidth of the connection has to be distributed between various requesters. The assignment of the connection may be made for each point in time independently or being clustered in time slots, such as in a TDMA system. Most important classes of data traffic are guaranteed throughput (GT) and best effort (BE) traffic. GT traffic implies that a prescheduled amount of data is exchanged at well-defined time instances. Isochronous data traffic is a particular case thereof, where data is transmitted at regular time-intervals. BE traffic class does not guarantee this but provides the best possible data rate. In the sequel data of the first class will also be denoted as guaranteed throughput data or GT data. The second class of data will also be denoted as best effort data or BE data. In particular for mobile devices, such as mobile phones, it is important to reduce power consumption. An important way to achieve this is to power down a data connection when there is no traffic. This feature is known in PCI Express. If it is detected that a data link is idle, it is powered down in about 20 bus cycles (8 ns). Subsequently it should stay in the power down mode during 50 bus cycles (20 ns). However, if there are frequent requests for data transmission, the idle time is too short to enable a power down.

SUMMARY

It is a purpose of the invention to provide a system in which the idle time remaining between data transmissions is more contiguously distributed.

It is a further purpose of the invention to provide a method that provides for a more contiguous distribution of the idle time remaining between data transmissions.

According to the invention the BE traffic is aligned with the GT traffic. The GT traffic has to be scheduled at predetermined intervals in order to achieve a guaranteed dataflow. The BE data traffic may be scheduled dynamically depending on the currently prevailing circumstances. By scheduling the BE data traffic aligned with the already scheduled GT traffic bursts it is achieved that fragmentation of the remaining time between data transmissions is kept limited. A particularly surprising aspect of the present invention is that the transmission of BE data is postponed while it could be accepted by the receiving device and there is no GT data traffic scheduled. Despite the fact that this postponement allows for a reduction in power consumption, the average amount of data transmitted per time unit can remain the same.

I.e. a request for BE traffic is postponed until directly after a GT transmission is finished or at a point in time before the GT-traffic starts. In that case the BE transmission preferably should be finished just before the GT traffic starts, or if that is not possible continue the already started BE traffic immediately after the GT transmission is finished. Anyhow a fragmentation of the idle intervals between the GT traffic intervals into a multitude of smaller idle intervals should be avoided. In an alternative embodiment the start of the transmission of BE data is scheduled at a point in time such that some time remains available after the end of the BE data transmission until the start of the next GT data transmission. In this way it can be taken into account that new acceptable BE data becomes available before the end of the scheduled BE data transmission. If executing a BE transmission before the next GT transmission would use too much of the remaining time to enable a power down, the BE transmission may be partially postponed until after the next GT transmission. For example the BE transmission may be aligned with a further BE transmission which on its turn is aligned with the subsequent next GT transmission.

The BE traffic is preferably regulated with a flow control facility. By means of flow control credits the second device, receiving the data indicates how many data-units it can accept before overflow occurs. To that end the second device sends a flow control credit to the first device each time it has room available for a new data-unit. Alternatively the first device may poll a register with the first device, which contains a value indicative for the amount of room available for new data-units.

BRIEF DESCRIPTION OF THE DRAWINGS

These and other aspects of the invention are described in more detail with reference to the drawings. Therein.

DETAILED DESCRIPTION

Figure 1:
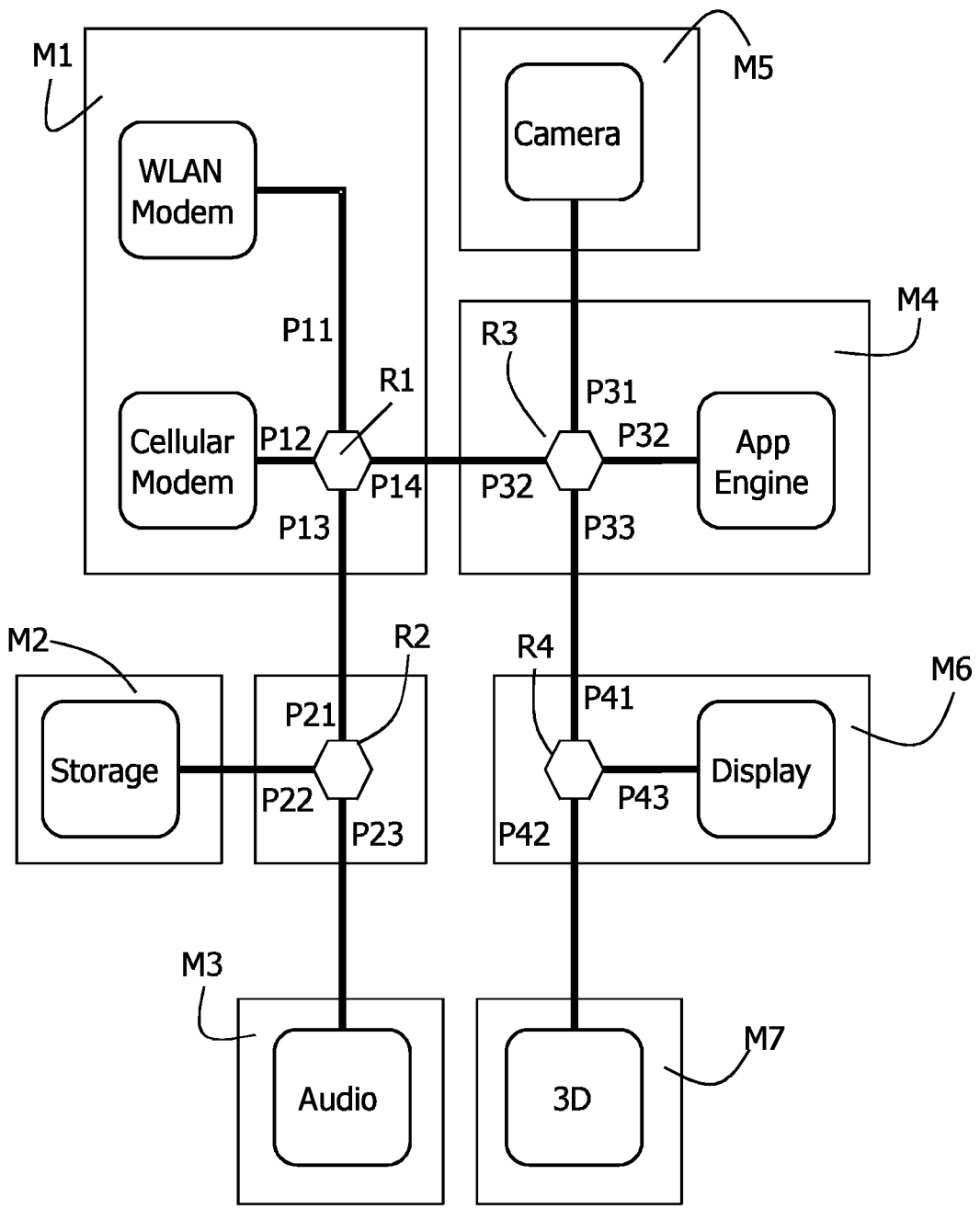
FIG. 1 shows a typical data processing system wherein the present invention can be applied.

FIG. 1 shows a typical system in which the present invention is applicable. The system comprises a plurality of modules. The modular architecture allows for a rapid design, as well as easy upgrading and redesign. The system includes a first module Ml that comprises various modems, here a WLAN modem and a cellular modem. The first module Ml also includes a first router R1, which apart from a first port P11 to the WLAN modem and a second port P12 to the cellular modem has a third port P13 and a fourth port P14. The third port P13 of the first router is coupled to a first port P21 of a second router R2, which is arranged as a separate module. The second router R2 further has a second port P22 coupled to a storage module M2 and a third port P23 coupled to an audio module M3.

The fourth port P14 of the first router R1 is coupled to a second port P32 of a third router R3, which is integrated with an application engine in an application module M4. The third router further has a first, third and fourth port. The first port P31 is coupled to a camera module M5 and the fourth port P32 is coupled to the application engine, which performs core processing for a particular application. The application engine may be a general-purpose processor or dedicated hardware. The third port P33 of the third router is coupled to a first port P14 of a fourth router R4.

The fourth router R4 is coupled to a display engine via a third port P43. The fourth router and the display engine are integrated into module M6. The fourth router R4 further has a second port P42 coupled to a 3D engine M7.

Data exchange between the routers and between routers and devices coupled to ports of the routers take place via a protocol such as PCI-Express. This protocol is described in detail in "Introduction to PCI Express" from Intel Press.

Figure 2:
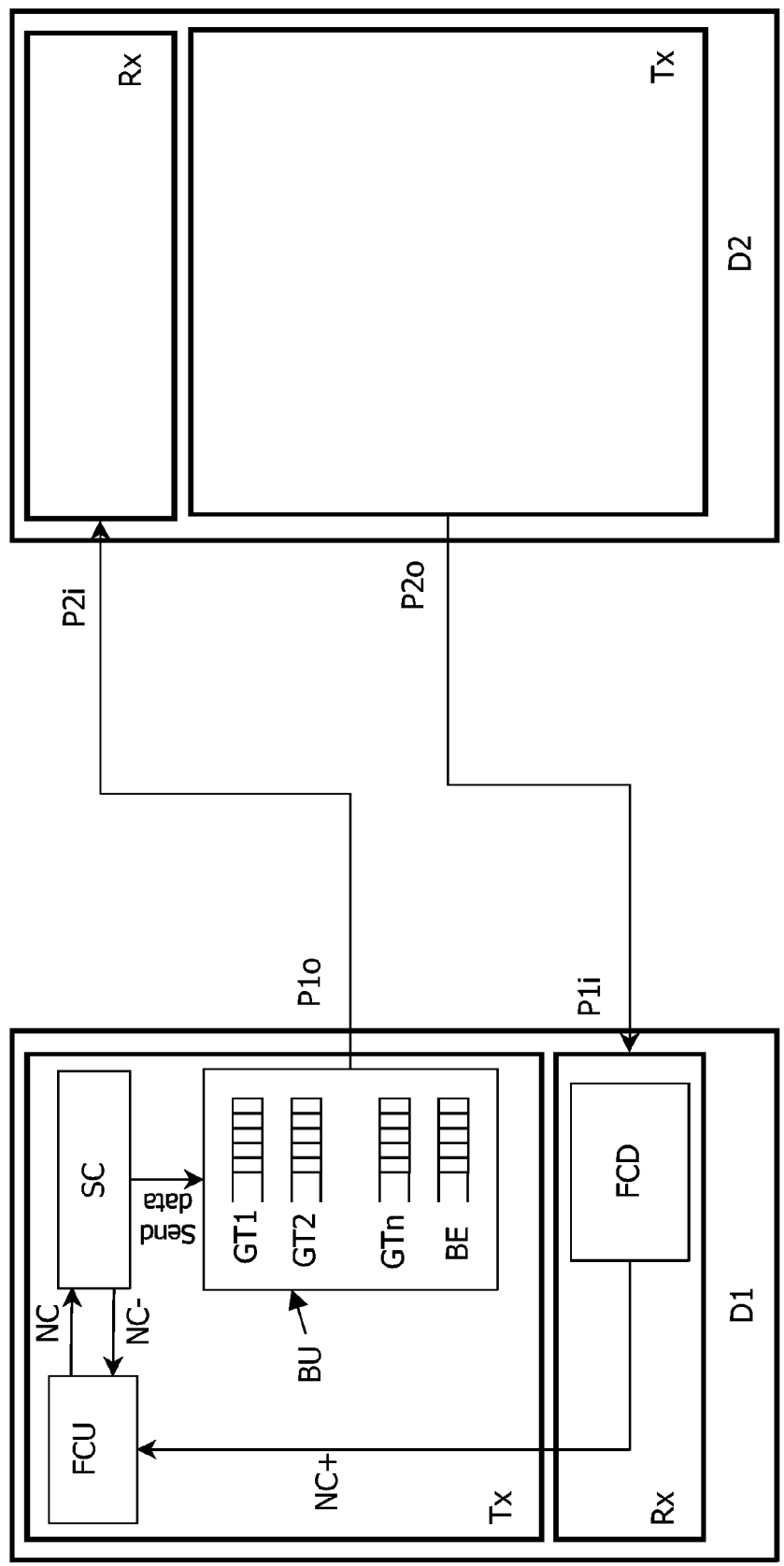
FIG. 2 shows in more detail a device of the data processing system.

FIG. 2 schematically shows two devices D1, D2 of the system shown in FIG. 1, e.g. two routers, or a router and a functional unit, such as a memory. The devices D1, D2 comprise a transmission section Tx and a receiving section Rx. An output port P1$o$ of device D1 is coupled to an input port P2$i$ of device D2. An output port P2$o$ of device D2 is coupled to an input port P1$i$ of device D1. In the embodiment shown device D1 transmits data via the link between its output port P1$o$ and input port P2$i$ of device D2. Device D2 indicates via the link between its output port P2$o$ and the input port P1$i$ of Device D1 the amount of data it can accept from D1. Likewise device D2 may have a facility for transmitting data to device D1 and device D1 may have a facility for indicating the amount of data it can accept from device D2. The transmitted data includes a first class of data, GT data, which is transmitted with a guaranteed throughput. This data is for example isochronous data, such as streaming audio or streaming video data. The transmitted data further includes a second class of data, BE-data, which is transmitted on a best effort basis, e.g. data exchanged between background processes. A uniform transmission mechanism may be used to transmit both the data, and to indicate the amount of data that can be accepted.

In FIG. 2 device D1 is shown in some more detail. Device D2 may have the same architecture. It can be seen that the receiving section of device D1 has a detection unit FCD for detecting the amount of BE data that can be accepted by D2. This is superfluous for GT data, as the transmission of this data is scheduled in advance.

Device D1 has a buffer unit BU with buffers GT1, GT2, ..., GTn, BE for various data sources. A scheduler SC determines which data is transmitted at what time taking into account a predetermined schedule for the GT data, buffered in buffers GT1, GT2, ..., and GTn and the amount of BE data available in buffer BE, as well as the amount of BE data NC that can be accepted by device D2. The latter information is retrieved from flow control unit FCU. The information in this unit FCU is updated by the scheduler by signal NC− if it has transmitted BE data, and by the detection unit FCD with signal NC+ if it has received information from device D2 about the acceptance of BE data, e.g. in the form of flow control units.

Figure 3A:
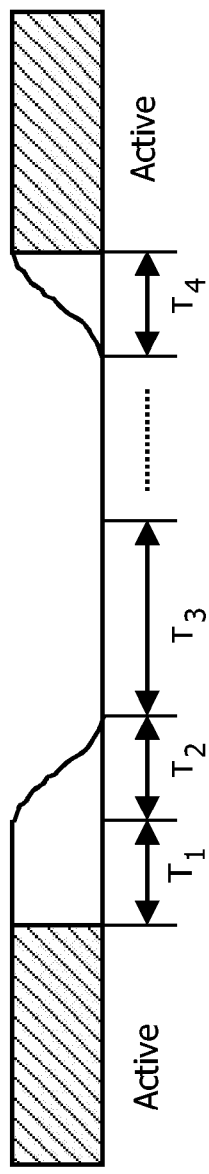
FIG. 3A schematically shoes the power consumption involved in the data transmission during various phases of activity of a link in the data processing system.

FIG. 3A schematically shows the power consumption via a link having a reducable power consumption during non-activity. For example PCI-Express provides for this feature. But also currently developed communication standards, in particular for mobile devices foresee in this feature. The transmitting device itself may indicate when, and for which period it will be inactive, but otherwise the communication facility may detect that a link is non-active and assume a low-power link mode. The PCI Express specification creates two low-power link states and the active-state power management (ASPM) protocol. When the PCI Express link goes idle, the link can transition to one of the two low-power states. These states save power when the link is idle, but require a recovery time to resynchronize the transmitter and receiver when data needs to be transmitted The longer the recovery time (or latency), the lower the power usage. The most frequent implementation will be the low-power state with the shortest recovery time. PCI-Express allows the transmitter for example to send an Electrical Idle ordered set, which comprises the four symbols COM Idle Idle Idle. These symbols are specific symbols related to 8/10 bit coding used by PCI-Express.

As shown in FIG. 3A during a first time interval, indicated as a hatched portion a data transmission takes place. During this time interval the link is fully powered up. It takes some time T1 to detect that the link is not active and to switch the link to a low power state. Once non-activity of the link is detected a power down procedure is initiated for that link, which in PCI Express takes 4 cycles of 0.4 ns. In PCI Express it takes a time interval T2 of about 20 cycles of 0.4 ns to attain full power down mode. Once full power down mode is achieved this should be maintained for a time interval T3 of minimally 50 cycles of 0.4 ns. Reactivating the link again requires a further time interval T4 of 20 cycles. These FIGS. of 4/20/50/20 cycles are specific for so-called sleep mode of the link. If the power down of the devices would also accompany the power down mode of the link, these times would look much different. For example during power up of a device coupled to the link time is necessary to train a PLL at the receiver side with an extended synchronization signal transmitted via the link. However if time is available for a power down of the device coupled to the link, without jeopardizing quality of service guarantees for the various data streams this is preferable, in order to further reduce power consumption.

Other protocols will generally require a different amount of time for power up and power down. In any case however, the power down state should be maintained for at least a minimum time interval to result in a true power saving.

Figure 3B:
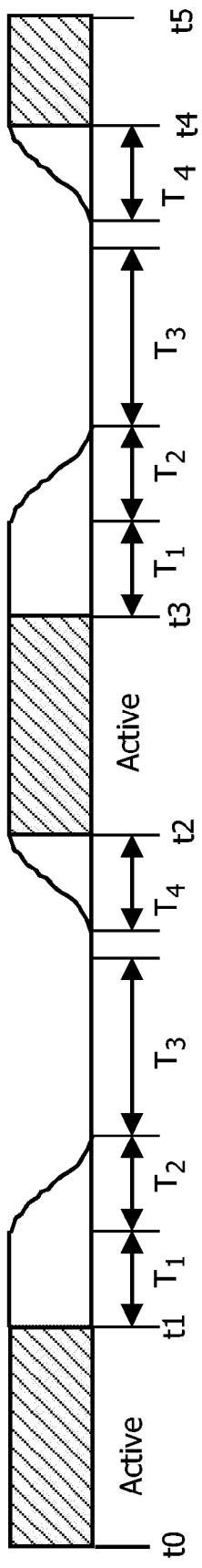
FIG. 3B shows the power consumption in a conventional mode of scheduling the BE data traffic.
Figure 3C:
FIG. 3C shows the power consumption in a mode of scheduling the BE data traffic, according to the invention.

With reference to FIGS. 3B and 3C, it is now assumed that a transmission of GT data is scheduled at time intervals t0-t1 and t4-t5, and that between points of time t1 and t4 time is available for a transmission of BE data.

FIG. 3B schematically shows the situation wherein the transmission of the BE data starts at a time interval t2−t1 later than the first transmission of GT data is finished, and finishes at a time interval t4−t3 before the next transmission of GT data starts.

The total remaining idle time between the data transmissions is (t4−t1)−(t3−t2). However, only during portions of this remaining idle time the link can be powered down. More in particular the total time during which the link is powered down is:

$$Tpd=(t4-t1)-(t3-t2)-2*(T1+T2+T4).$$

FIG. 3C shows the situation wherein the start of transmission of the BE data is postponed until a point in time t2$p$. In particular this point in time t2$p$ is scheduled such that the transmission of the BE data is exactly completed at the start of the subsequent transmission of GT data. Alternatively, however, the point in time t2$p$ may be scheduled a bit earlier, taking into account that additional BE data becomes available for transmission during the current transmission of BE data, or a bit later. In the latter case the remaining BE data may be transmitted immediately after the transmission of GT data is finished. In any case the transmission of BE data starts after at a point in time (t2_start) where the remaining time interval (tl_start) until the start of the next burst of GT data minus the required time (t2_burst) for transmitting the burst of BE data is less than a predetermined time Tp.

Figure 3D:
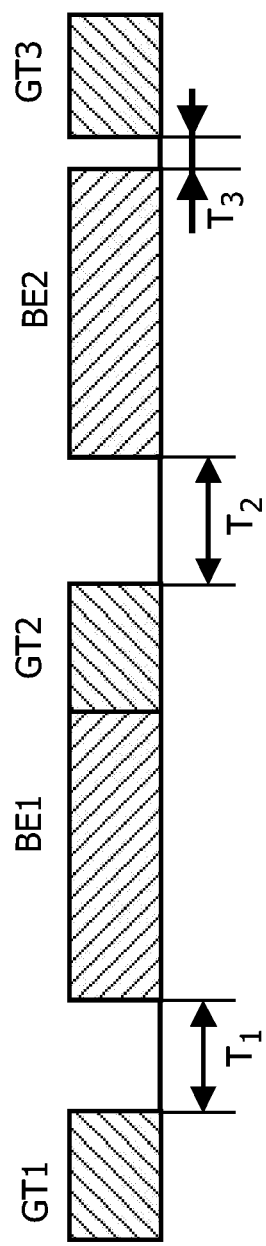
FIGS. 3D and 3E shows the power consumption in a further mode of scheduling the BE data traffic, according to the invention.

In the situation illustrated in FIG. 3C, again the total remaining idle time is (t4−t1)−(t3−t2). However in this case during a significantly longer portion of the remaining idle time can the link be powered down. Power down is possible during Tpd=(t4−t1)−(t3−t2)−(T1+T2+T4), as in this case only once between the GT transmissions it is necessary to detect power down, initialize power down, and reactivate the link. Despite the fact that the total energy consumption is lowered, the total amount of transmitted data remains the same. FIG. 3D shows a situation, wherein subsequently a first GT transmission GT1, a first BE transmission BE1, a second GT transmission GT2, a second BE transmission BE2 and a third GT transmission GT3 take place. In the situation shown the time intervals T1, T2 and T3 are each shorter than a minimum required time interval $T_{min}$ for power down of the link. Likewise the time interval T2+T3 would be too short for power down if the second BE transmission would be aligned with the third GT transmission.

Figure 3E:
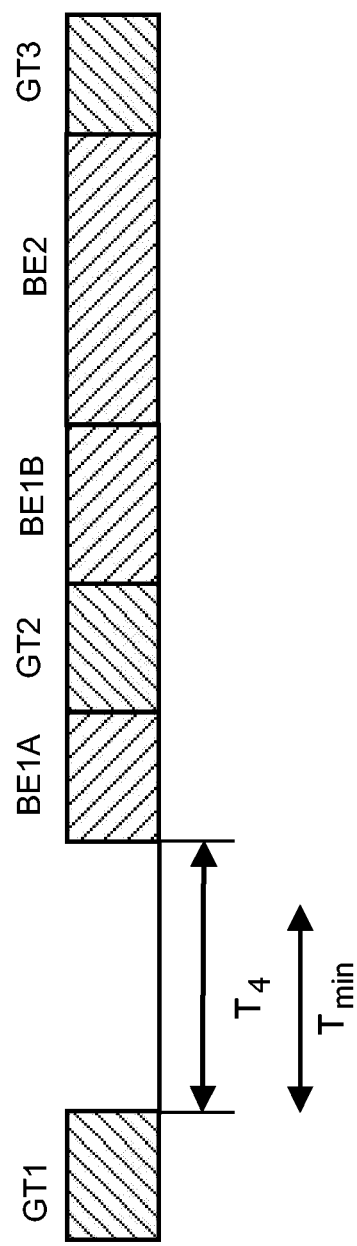

FIG. 3E shows a way of operation of an embodiment of the invention, wherein the end of the first BE transmission BE1 is postponed until after the next GT transmission GT2. In particular the end of the first BE transmission is delayed until a start of the next BE transmission BE2. This next BE transmission BE2 is aligned with the subsequent next GT transmission GT3. In the example shown the first BE transmission is split in a first partial transmission BE1A and a second partial transmission BE1B. Now the total remaining idle time between the first and the second GT transmission is T4=T1+T2+T3, which is longer than the minimum required time interval $T_{min}$.

Figure 4:
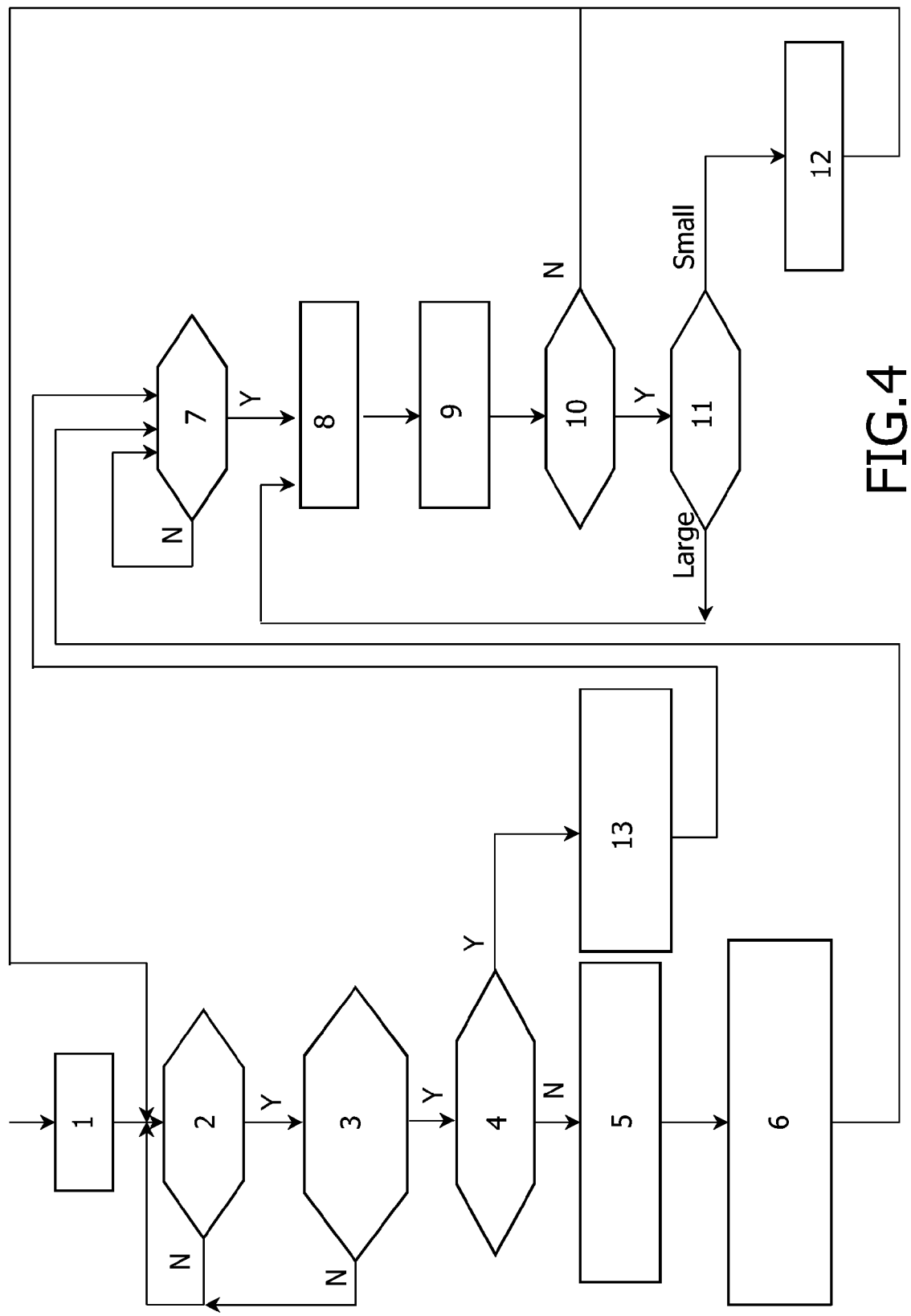
FIG. 4 is a flow chart illustrating a method according to the invention.

FIG. 4 schematically shows a method according to the invention.

After initialization in step 1, a waiting step 2 is repeated until either new BE data is available for transmission, or the receiving device indicates that it can accept new data-units, for example by flow control credits If one of these conditions is applicable step 3 is executed.

In step 3 it is verified whether there is data available for transmission and the receiving device can accept the data at this moment. If this is the case the method continues with step 4, else step 2 is repeated.

In step 4 it is verified whether currently a GT data transmission takes place. If this is not the case the method continues with step 5. If a GT data transmission is ongoing step 13 is executed.

In step 5 the remaining time-interval tl_start until the next scheduled GT data transmission is determined.

In step 6 following step 5 it is determined at which point in time t2_start, defining the time at the moment of the determination as t=0, the transmission of the available BE data which can be accepted by the receiving device should be transmitted. This point in time t2_start should comply with the following:

$$t2\_start + t2\_burst \geq t1\_start - Tp$$

Herein t2_burst is the amount of time necessary to transmit the available and acceptable BE data. t1_start is the point in time where the next GT data transmission is scheduled.

Tp is a predetermined amount of time. If Tp=0 the burst of BE data is completed exactly at the same time when the next GT transmission starts.

In this way it is prevented that the remaining idle time, i.e. the time between the upcoming and the previous GT data transmission not used for transmission of BE data is fragmented into a time interval before the BE data transmission and a time interval after the BE data transmission. This increases the possibility that the remaining idle time is long enough to enable a power down of the transmission channel.

In step 7 the point in time t2_start is compared with the current point in time t.

If t≥2 T2_start the method continues with step 8, otherwise step 7 is repeated.

In step 8 BE data is transmitted for a time-period of maximal tl_start-t2 start.

In step 9, at the point in time tl_start, the transmission of BE data is completed, or is interrupted to enable the scheduled transmission of GT data. The administration of the available BE data available for transmission, and of the data acceptability status, e.g. flow control credit count is updated. Preferably updating takes place during the GT data transmission.

In step 10, at the end of the GT data transmission it is verified whether still BE data is ready for transmission. If this is the case it is verified in step 11 whether the amount of data is 'small' or 'large'. The amount is considered to be small if it can be transmitted between two GT data transmissions, while still preserving idle time, and considered to be large otherwise. In case of a large amount of data, the method continues with step 8. If the amount of data is small the method continues with step 12, wherein the BE data is transmitted. When this transmission is finished the method continues with step 2.

In step 13 it is determined at which point in time tl_end an ongoing GT data transmission is finished. This point in time is also the start time t2_start for the transmission of the BE data. Step 13 is followed by step 7.

Figure 5:
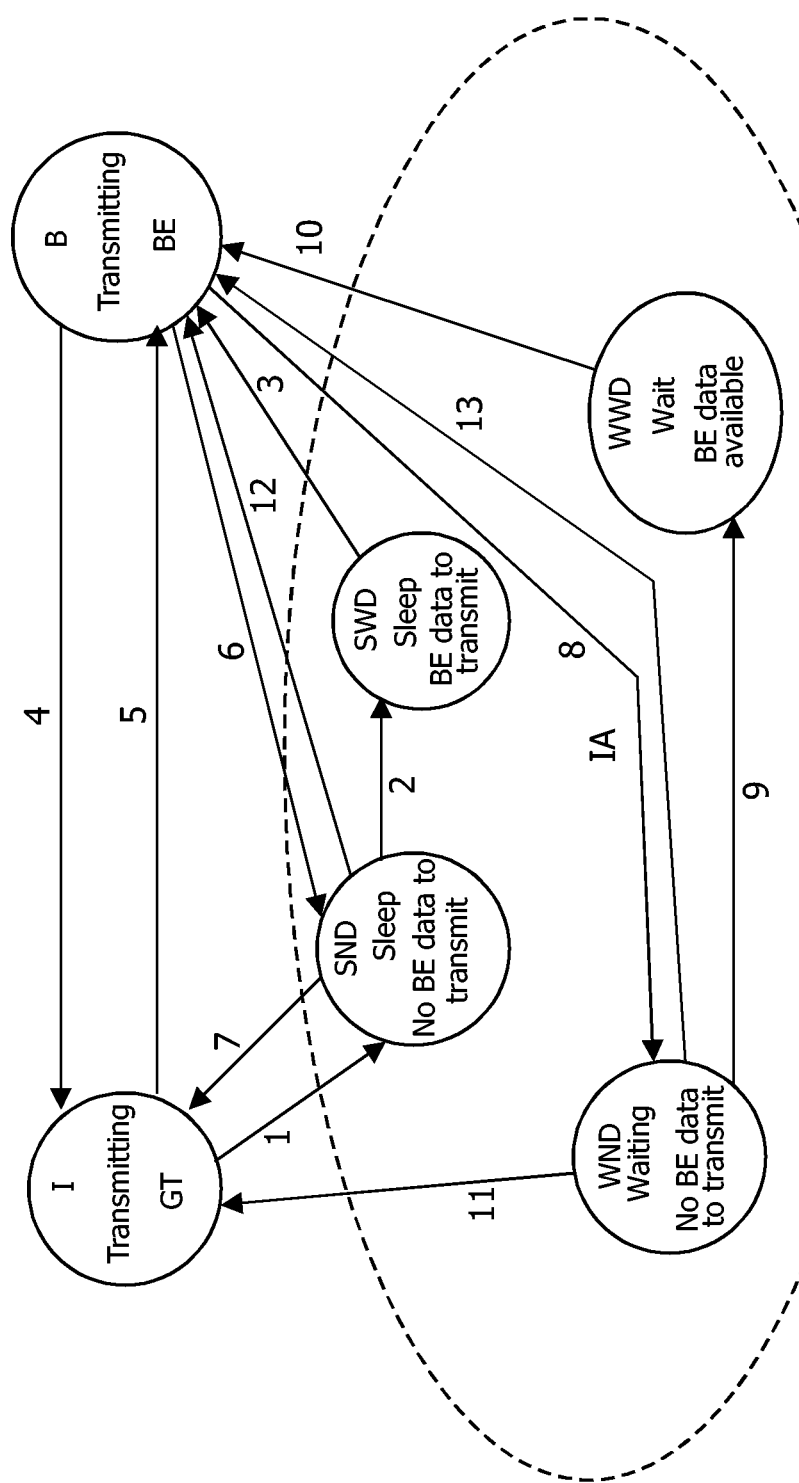
FIG. 5 shows a state diagram with possible states of a device according to the invention and the transitions between them.

The invention is further illustrated with reference To a state diagram in FIG. 5.

As can be seen in the state diagram, the system can have 3 main states:

I: transmitting GT data
B: transmitting BE data
IA: inactive: not transmitting data.

The third state IA has 4 sub-states:
SND: A low power of sleep mode and no acceptable BE data is available for transmission
SWD: A low power or sleep mode and acceptable BE data is available for transmission
WND: A normal power mode and no acceptable BE data is available for transmission The following state transitions may occur 1. After a GT transmission is completed and no acceptable BE data is available at that moment, the system enters a low power mode SND.

2. If in mode SND BE data comes available and the amount of data is insufficient to maintain a transmission of BE data until the next GT transmission the system enters low power mode SWD 3. if in low power mode SWD the point in time is reached that in the remaining time until the next GT data transmission a BE data transmission can be maintained the system continues with state B, wherein it transmits the available BE data.

4. This transition takes place if the scheduled point in time is reached for a GT data transmission.

5. If BE data is available immediately after the GT data transmission, the system starts immediately with transmitting this BE data.

6. If the BE transmission is complete, and there is still enough remaining time for power down until the next scheduled GT data transmission the system enters state SND via transition 6

7. This state ends via transition 7 if it is time for the next scheduled GT data transmission.

8. Alternatively if the system has completed a BE data transmission and the remaining idle time is insufficient for power down, the system assumes temporarily the normal powered wait state WND.

9. During the wait state WND new BE data may become available. If the amount of BE data is insufficient To maintain a data transmission until the next GT data transmission the system further waits in state WWD. Although in this case the idle time is still too small to enter a low power state, the contiguous idle time may be useful for other purposes, for example to transmit link control information. In another embodiment the state WWD may be skipped.

10. if in mode WWD the point in time has reached that in the remaining time until the next GT data transmission a BE data transmission can be maintained the system continues with state B, wherein it transmits the available BE data.

11. A transition from the wait state WND to state I occurs at the point in time that the next GT data transmission starts.

12. If during the power down state SND a sufficient amount of acceptable BE data had become available to maintain a data transmission until the next GT data transmission a transition takes place to mode B, 13. Likewise when the system is in mode WND and a sufficient amount of BE data has become available a transition To state B takes place in order to transmit the BE data.

Figure 6:
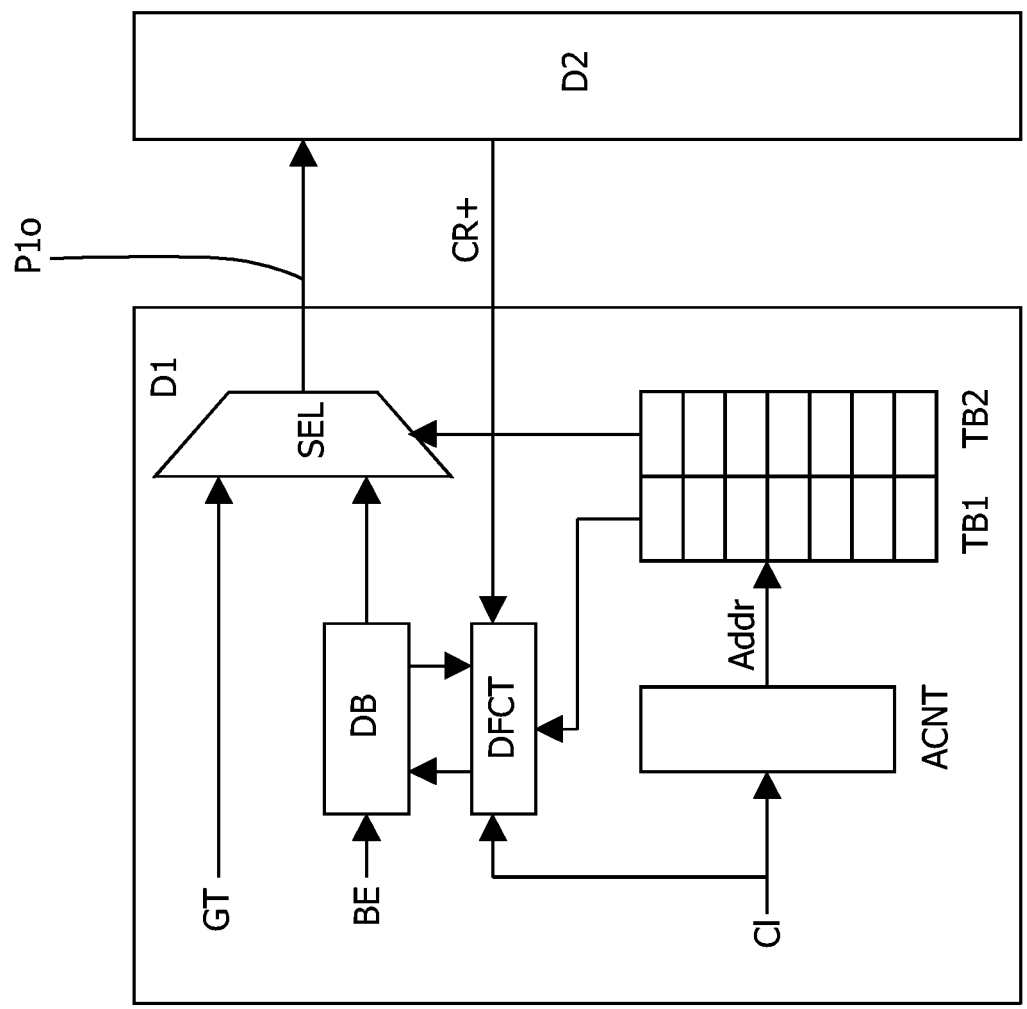
FIG. 6 schematically shows a device according to the invention.

FIG. 6 shows in more detail a device D1 of FIG. 2 which implements the principles of the invention as described above. The device D1 comprises an output port Plo for transmitting data to a second device D2. A selection facility SEL selectively allows access of GT data or BE data to the output port Plo. The selection device SEL is controlled by a control facility. In the embodiment shown the control facility comprises a counter ACNT, which upon receipt of a clock signal CI cyclically addresses a binary lookup table TB2. The value at the addressed location of the lookup table TB2 indicates the selection to be made by the selection element SEL. Alternatively the control facility may be a state machine. The selection device SEL is for example a multiplexer, as shown in this embodiment, but may otherwise comprise a pair of a: first and a second three state gates of which at least one is in the high-ohmic state. The device further comprises at least a buffer facility DB for temporarily storing BE data. The device may comprise an additional buffer facility for temporarily storing GT data, but this is not strictly necessary, as the transmission schedule for the device may be tightly synchronized with other devices, so that received GT data is immediately transmitted to its next destination.

The device further comprises a facility for computing a duration of a first time interval tl_start between a point in time where a next asynchronous data transmission is scheduled and a current point in time, and for computing a second time interval t2_burst required for transmitting the amount of BE data which is available, and which the second device is ready to accept. In the embodiment shown the facility for computing the first time interval comprises a lookup table TB1 and a counter ACNT for addressing the lookup table. Upon receipt of a clock signal CI the counter cyclically addresses the lookup table TB1. Each location of the lookup table comprises an indication of the duration of the time interval until the next GT data transmission. Otherwise the locations of the lookup table TB1 may contain an indication for the point in time when the next GT data transmission will take place. The first time interval is then obtained by subtraction of the current point in time from the value stored in the table TB1. A controller, for example controller DFCT, may carry out this subtraction.

The controller further calculates the duration of a second time interval t2_burst from the amount of BE data which is available in the buffer DB and which the second device D2 is ready to accept. Typically the duration of the second time interval is assumed to be proportional to this amount. The duration may be computed by dedicated hardware or by a general computing facility.

The controller DFCT of the device D1 further comprises a facility for detecting the condition that the difference between the first time interval and the second time interval is less than a predetermined value Tp, and for allowing transmission of the BE data if this condition is met.

The controller may provide an output signal indicative for the expected activity of the link. For example it may provide an activate signal, for example to the receiving device, to indicate that it will start transmission of a next burst of data within a predetermined number of clock cycles. The receiving device can use this signal to activate itself, and be fully operational again when the burst of data actually starts. Instead of issuing an activate signal a predetermined time period in advance, the controller may regularly or continuously provide information about the number of clock cycles until the next burst of data is transmitted. The device D1 may further power down a particular set of its facilities, e.g. output buffers, if the activity of the link is expected to be low during a sufficiently long time.

Figure 7:
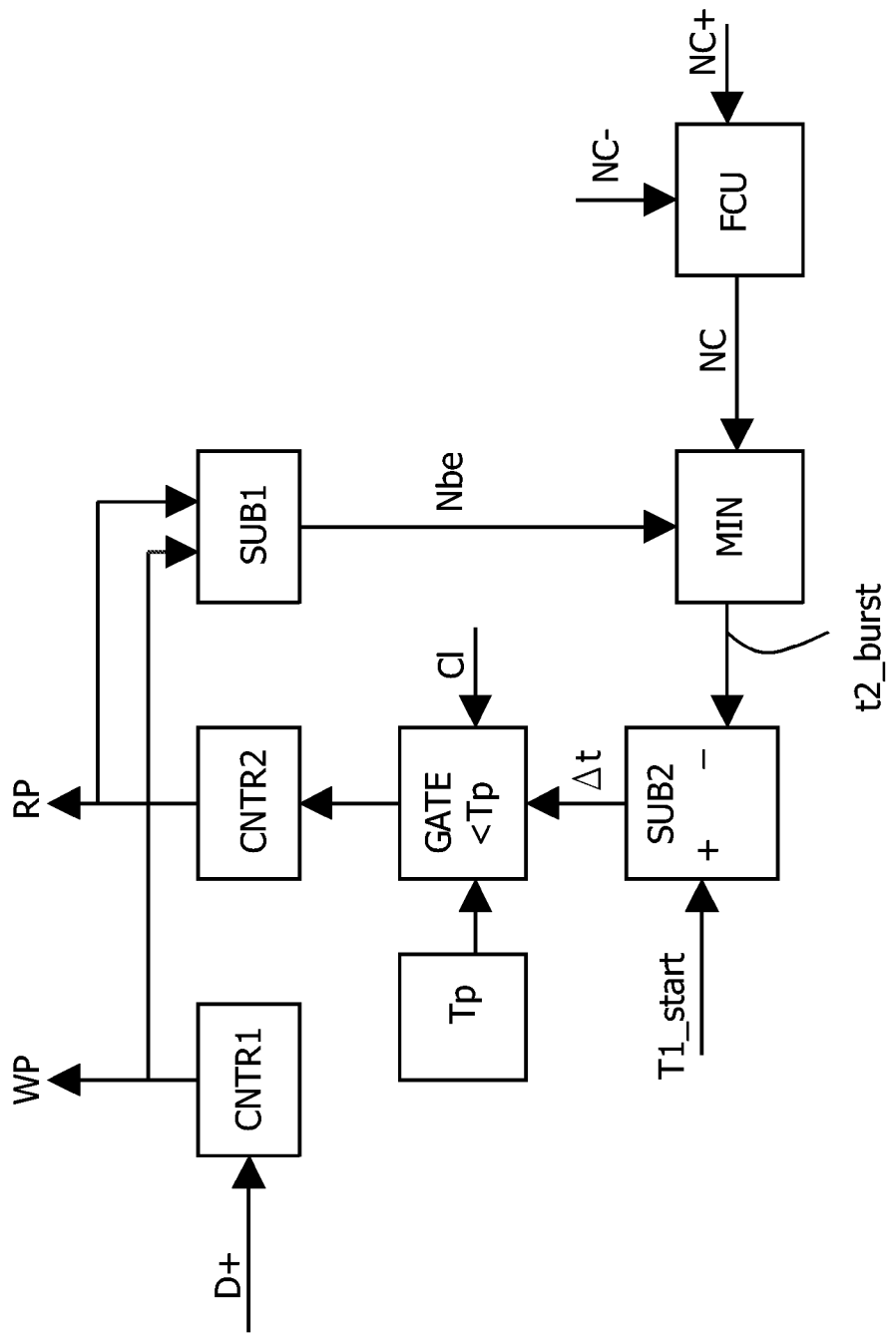
FIG. 7 shows an aspect of the device of FIG. 6 in more detail.

An example of the controller DFCT is shown in more detail in FIG. 7.

The controller shown therein comprises a first counter CNTRI and a second counter CNTR2 for controlling the buffer facility DB. The write counter indicates a location WP in the buffer where new BE data can be stored temporarily, and the read counter indicates the location RP in the buffer from which the BE data can be read. In other embodiments a shift register may be used, or in case the order of the data may be ignored, it may be stored on a stack. In the embodiment shown the write pointer WP is cyclically incremented each time the counter D+ receives a signal indicative for the arrival of a new BE data. A subtractor SUB calculates from the values of the write pointer WP and the read pointer RP the amount of BE data Nbe available. The flow control unit FCU calculates which amount of data NC the receiving device D2 is ready to accept, by monitoring a number of credits NC+ received from device D2 and a number of credits NC− consumed by the sending device D1. Each credit indicates that the device D2 may accept a new data unit, for example a byte, a word or a packet of words. The unit MIN calculates the amount of data which can subsequently be transmitted. This amount is the minimum of the amount of data available Nbe and the amount of data NC which can be accepted. The unit MIN provides an output value t2_burst indicative for the required time interval for this transmission. A further substractor SUB2 subtracts this value t2_burst from the value of the time interval t1_start remaining until the next scheduled GT transmission, and provides a value indicative for the difference Δt to a gate GATE. The gate GATE compares the value Δt with a predetermined value Tp. As soon as the condition Δt<Tp holds the gate transmits a clock signal Cl to the second counter CNTR2, which controls the read pointer RP of the data buffer DB. In response thereto the data buffer DB releases its BE data.

Tp can have a value 0 in which case the completion of the transmission of the amount of BE data acceptable for the second device D2 coincides with the start of the next GT data transmission. A value Tp>0 may be selected, to take into account that new BE data becomes available or that the second device D2 may accept additional BE data during the current transmission of the BE data. A negative value of Tp would generally not be advantageous, as in that case the transmission of BE data is postponed for a longer time than necessary.

It is remarked that the scope of protection of the invention is not restricted to the embodiments described herein. Parts of the system may implemented in hardware, software or a combination thereof. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. A system, comprising:
   a device for transmitting data to a second device using a transmitter comprising an output port for transmitting data to the second device, wherein the device is configured to transmit a first class of data as a guaranteed stream of data-units at predetermined time instances and is configured to transmit a second class of data on a best effort basis, wherein the device starts a transmission of a burst of data-units which belong to the second class at a point in time where a remaining time interval until the start of a next burst of first-class data minus a required time for transmitting a burst of second-class of data is less than a predetermined time.

2. A system according to claim 1, comprising
   a selection facility for selectively allowing access from one of at least first class data or second class data to the output port,
   at least a buffer facility for temporarily storing second class data,
   a facility for computing a first time interval between a point in time where a next asynchronous data transmission is scheduled and a current point in time, and for computing a second time interval required for transmitting the amount of best effort data which is available, and which the second device is ready to accept, and
   a transmission control facility for detecting the condition that the time interval difference between the first time interval and the second time interval is less than or equal to a predetermined value, and for allowing the second class data to be transmitted if this condition is met.

3. A system according to claim 2, characterized in that the transmission control facility schedules the point in time of the start of the transmission of the burst of second class data and initiates this start by counting down until that point in time.

4. A system according to claim 2, characterized in that the transmission control facility recalculates the time interval difference regularly and initiates the start of the transmission of the burst of second class data if the said condition is met.

5. The system of claim 1, wherein the device is used as a router for a data processing system.

6. The system of claim 1, wherein the device is used as a functional unit for a data processing system.

7. A method for transmitting data, comprising:
   transmitting a first class of the data as a guaranteed throughput stream of data units at predetermined time instances using an output port for transmitting data to a second device; and
   transmitting a second class of the data on a best effort basis, wherein a transmission of data belonging to the second class is started at a point in time where a remaining time interval until the start of a next burst of first-class data minus a required time for transmitting the burst of second-class of data is less than a predetermined time.

8. The method of claim 7, wherein the method is performed using a device comprising:
   a selection facility for selectively allowing access from one of at least first class data or second class data to the output port,
   at least a buffer facility for temporarily storing second class data,
   a facility for computing a first time interval between a point in time where a next asynchronous data transmission is scheduled and a current point in time, and for computing a second time interval required for transmitting the amount of best effort data which is available, and which the second device is ready to accept,
   a transmission control facility for detecting the condition that the time interval difference between the first time interval and the second time interval is less than or equal to a predetermined value, and for allowing the second class data to be transmitted if this condition is met.

9. The method according to claim 8, wherein the transmission control facility schedules the point in time of the start of the transmission of the burst of second class data and initiates this start by counting down until that point in time.

10. The method according to claim 8, characterized in that the transmission control facility recalculates the time interval difference regularly and initiates the start of the transmission of the burst of second class data if the said condition is met.

11. The method according to claim 7, wherein the device is used as a router for a data processing system.

12. The method according to claim 7, wherein the device is used as a functional unit for a data processing system.

13. An apparatus, comprising:
    a transmitter circuit of a device comprising an output port that is used by the transmitter circuit to transmit data, wherein the apparatus is configured to transmit a first class of data as a guaranteed stream of data-units at predetermined time instances and is configured to transmit a second class of data on a best effort basis, wherein the apparatus starts a transmission of a burst of data-units which belong to the second class at a point in time where a remaining time interval until the start of a next burst of first-class data, minus a required time for transmitting the burst of second-class of data is less than a predetermined time.

14. An apparatus according to claim 13, further comprising:
    a selection facility for selectively allowing access from one of at least first class data or second class data to the output port,
    at least a buffer facility for temporarily storing second class data,
    a facility for computing a first time interval between a point in time where a next asynchronous data transmission is scheduled and a current point in time, and for computing a second time interval required for transmitting the amount of best effort data which is available, and which the second device is ready to accept,
    a transmission control facility for detecting the condition that the time interval difference between the first time interval and the second time interval is less than or equal to a predetermined value, and for allowing the second class data to be transmitted if this condition is met.

15. An apparatus according to claim 14, characterized in that the transmission control facility schedules the point in time of the start of the transmission of the burst of second class data and initiates this start by counting down until that point in time.

16. An apparatus according to claim 14, characterized in that the transmission control facility recalculates the time interval difference regularly and initiates the start of the transmission of the burst of second class data if the said condition is met.

17. An apparatus according to claim 13, wherein the apparatus is used as a router for a data processing system.

18. An apparatus according to claim 13, wherein the apparatus is used as a functional unit for a data processing system.

19. An apparatus according to claim 13, wherein the determination of the predetermined time is based upon the protocol in use by the apparatus.

20. The method according to claim 7, wherein the determination of the predetermined time is based upon the protocol in use by the apparatus.

\* \* \* \* \*